United States Patent
Le et al.

(10) Patent No.: US 8,214,134 B2
(45) Date of Patent: *Jul. 3, 2012

(54) METHOD AND APPARATUS FOR A THREE DIMENSIONAL FUEL CUT-OFF SYSTEM

(75) Inventors: Jialiang Le, Canton/Wayne, MI (US); Todd Clark, Dearborn/Wayne, MI (US); Manoharprasad K. Rao, Novi/Oakland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 819 days.

This patent is subject to a terminal disclaimer.

(21) Appl. No.: 12/266,966

(22) Filed: Nov. 7, 2008

(65) Prior Publication Data

US 2010/0121525 A1 May 13, 2010

(51) Int. Cl.
*G06F 17/00* (2006.01)
*G06G 7/70* (2006.01)

(52) U.S. Cl. .................................................. 701/112
(58) Field of Classification Search .................. 701/82, 701/86, 103, 104, 112, 123; 431/18, 35, 431/44, 61–67, 82, 153, 195, 199, 363; 303/145
See application file for complete search history.

(56) References Cited

U.S. PATENT DOCUMENTS

| | | | |
|---|---|---|---|
| 5,797,111 A | 8/1998 | Halasz et al. | |
| 6,640,174 B2 | 10/2003 | Schondorf et al. | |
| 6,766,235 B2 | 7/2004 | Frimberger et al. | |
| 7,086,493 B2 | 8/2006 | Knight | |
| 7,347,177 B2 | 3/2008 | Tippy et al. | |
| 2002/0135168 A1* | 9/2002 | Mattes et al. | 280/735 |
| 2007/0203615 A1 | 8/2007 | Tustanowski et al. | |
| 2008/0254690 A1* | 10/2008 | Kishibata | 440/1 |

* cited by examiner

*Primary Examiner* — Mary Cheung
(74) *Attorney, Agent, or Firm* — Franklin MacKenzie; Ford Global Technologies, LLC

(57) ABSTRACT

A three dimensional vehicle fuel cut-off system and method of accomplishing the same.

4 Claims, 5 Drawing Sheets

METHOD AND APPARATUS FOR A THREE DIMENSIONAL FUEL CUT-OFF SYSTEM

TECHNICAL FIELD

This disclosure relates to the field of controlling vehicle fuel delivery during perceived crash events. More particularly, the disclosure related to controlling the fuel delivery using an algorithm that provides robust control of fuel cut-off thresholds. More specifically, the present disclosure relates to a method and system of using an algorithm representing a three dimensional model of a vehicle to deliver robust fuel cut-off signals of varying intensity to a fuel delivery pump in response to perceived crash events as relayed by senor input of vehicle roll, pitch, lateral, longitudinal and vertical acceleration factors. These and other aspects of the disclosure will become apparent upon a reading of the appended specification.

BRIEF SUMMARY OF THE INVENTION

In one aspect, the present disclosure relates to a fuel cut-off system, comprising:
   at least one longitudinal and lateral acceleration sensor;
   at least one roll rate and pitch rate sensor;
   at least one satellite longitudinal and lateral acceleration sensor;
   a restraint control module that receives data from the acceleration sensors, roll rate and pitch rate sensor and satellite acceleration sensors;
   and an algorithm used by the restraint control module to deploy fuel cut-off signal of varying intensity when the sensors indicate that the vehicle is beyond predetermined pitch and pitch rate, roll and roll rate, lateral or longitudinal acceleration thresholds. The algorithm preferably utilizes at least one of vehicle pitch and pitch rate, vehicle roll and roll rate, or longitudinal and lateral accelerations to determine fuel cut-off. When one of the fuel cut-off thresholds is nil, the fuel cut-off is not reset able. The algorithm is resident in a controller, preferably a restraint control module, and may use maps or tables within memory, populated with data points of predetermined longitudinal, lateral, pitch and roll directions of the vehicle, together with an equation for such a defined three dimensional model. More preferably, the fuel cut-off system algorithm utilizes a look-up table populated based upon predetermined longitudinal, lateral, vertical directions, pitch and roll directions of the vehicle along with equations for the three dimensions defined thereby.

In another embodiment, the fuel cut-off system algorithm may employ data received from a longitudinal and lateral acceleration sensor to verify that a vehicle crash condition has occurred.

When a crash event has been detected that exceeds the predetermined thresholds, the fuel delivery via an electronic controlled fuel pump having a controller with memory and fuel delivery data resident therein permits varying degrees or intensity of fuel cut-off to occur based upon sensor input relative to a perceived crash event. The algorithm is particularly suitable for use with a restraint central module that controls a signal output to a vehicle fuel pump when crash sensors sense a vehicle crash event that meets or exceeds a fuel cut-off threshold employed by the algorithm wherein the fuel cut-off threshold is generally three dimensional.

In another embodiment, a crash event is perceived when at least one of pitch and pitch rate exceeds a predetermined threshold value from plane of normal, roll and roll rate exceeds predetermined threshold value from plane of normal, lateral accelerations exceeds a predetermined threshold value, or longitudinal acceleration exceeds a predetermined threshold value. In another embodiment, the algorithm for controlling fuel cut-off uses the input for lateral, vertical, pitch and roll directions and compares them to the predetermined thresholds to determine whether to cut-off fuel delivery. The algorithm generally utilizes a data map or look-up table populated based upon three dimensional input along with equations to define said three dimensions.

In another embodiment, the disclosure relates to a method for controlling fuel delivery and signal output to a vehicle fuel pump. In one embodiment, the method comprises utilizing an algorithm in a restraint central module of the vehicle, the algorithm deploying a fuel cut-off signal when crash sensors sense a vehicle crash condition that meet or exceeds a fuel cut-off threshold employed by the algorithm, wherein the fuel cut-off threshold is three dimensional.

In another embodiment, the algorithm may access a look-up table populated with data based upon a predetermined minimum and maximum changes in velocity and rotational rates in the three-dimensional model defined by lateral, vertical, pitch and roll directions respectively of a vehicle, along with the equation for a three-dimensional model.

These and other embodiments will be apparent upon a reading of following description of the invention as set forth below.

DETAILED DESCRIPTION OF THE INVENTION

Figure 1:
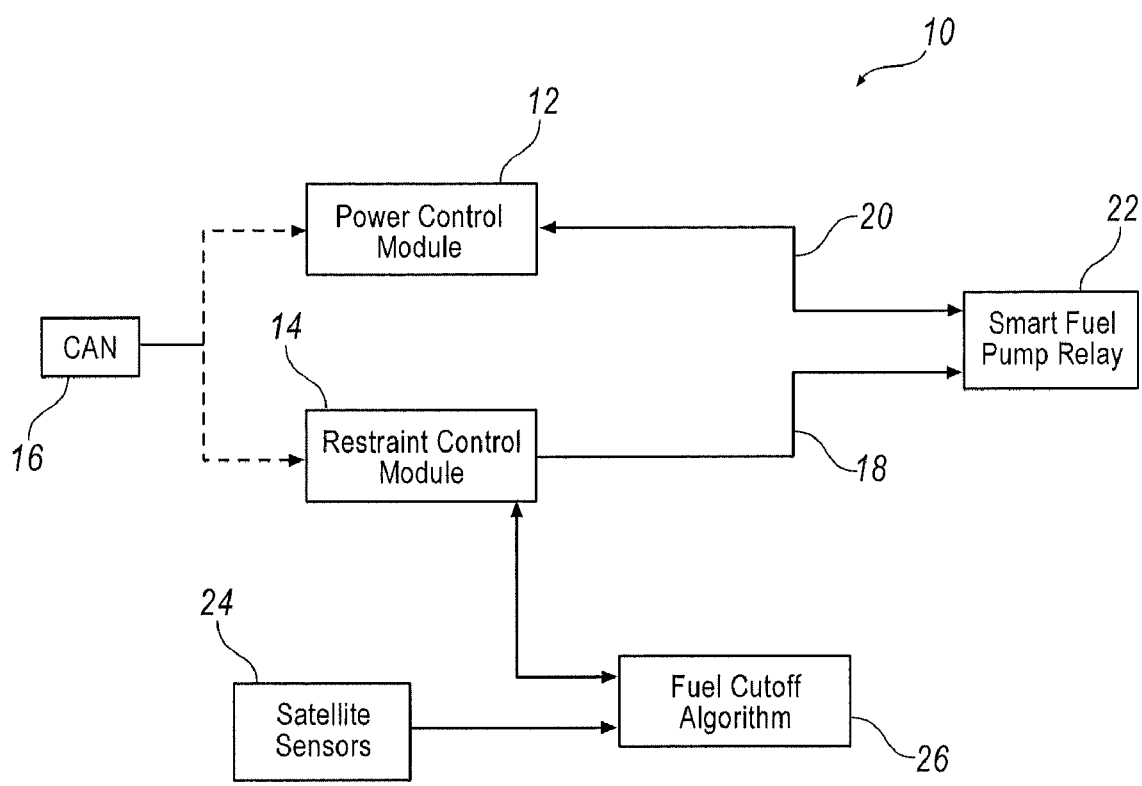
FIG. 1 is a schematic representation of the apparatus for a three dimensional fuel cut-off system according to one embodiment of the disclosure.

Turning now to the drawings wherein like numbers refer to like structures, and particularly to FIG. 1, there is shown a schematic representation of an apparatus showing one embodiment of the system according to the present disclosure.

Specifically, apparatus or system 10 is comprised of a power control module 12 and a restraint control module 14 in electronic communication with each other by means of Controller Area Network (CAN) 16. The power control module and the restraint control module have memory with operating instructions resident therein. The power control module is in electronic communication with smart fuel relay pump 22, which is a relay pump equipped with a microchip that has memory and instruction to control the delivery of fuel according to signals received from either the power control module, or in the case of a perceived crash event, from the restraint control module in a manner to be hereinafter described.

Resident in the restraint control module is a fuel cut-off algorithm 26. The restraint control module receives input from vehicle sensors through the CAN and compares the received signals from remote sensors to the stored threshold data in memory to determine whether a crash event has occurred. The vehicle crash sensors transmit data relative to lateral, longitudinal and vertical acceleration and deceleration, as well as direction off travel all in a manner as is known in the art. The system includes satellite sensors 24, that provides sensor data input relative to longitudinal and lateral accelerations, vehicle pitch and roll rate related to the pitch and roll attitude of the vehicle to the restraint control module, If at least one, and preferably more than one input from the sensors exceeds predetermined thresholds in memory in the restraint control module, an event notification signal (ENS) is transmitted via electronic connection 18 to the smart fuel pump relay of varying intensity, and the micro controller in the smart fuel pump relay can execute a cut-off of fuel of varying intensity, dependent upon the sensed vehicle conditions. In another embodiment, a redundant signal can also be transmitted from the Power Control Module to the Smart fuel pump relay.

Figure 2A:
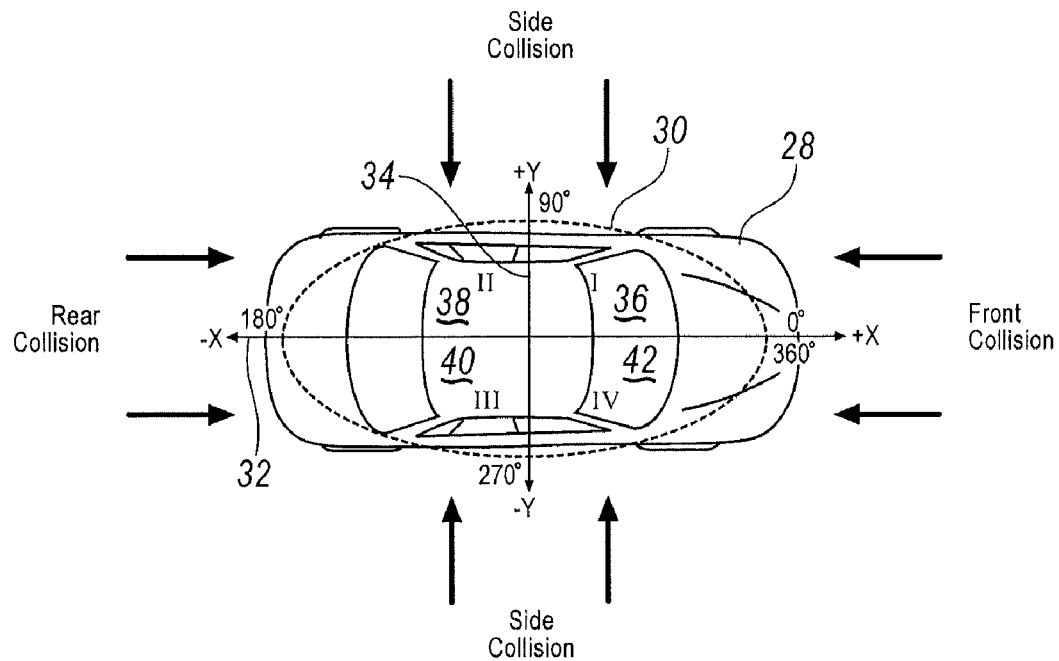
FIG. 2A is a top view of a schematic representation of a vehicle showing lateral and longitudinal directions of travel together with the ellipse defined thereby which is divided into quadrants.

FIG. 2A is a top view of a vehicle showing the lateral and longitudinal directions and the ellipse formed thereby. In this regard, the entirety of co-pending US Patent Publication Application 2007/0203615A is incorporated by reference as if fully set forth herein. Basically, the system includes disabling the fuel supply based upon the severity of a crash event which is assessed by means of an elliptical threshold that uses accelerations along vehicle longitudinal and lateral directions. The system further utilizes the pitch and roll of the vehicle which is an improvement over the system described in US 2007/0203615A, in that in addition to a two dimensional model, it includes roll and pitch angle information to control the fuel cut-off according to a three dimension model.

Figure 2B:
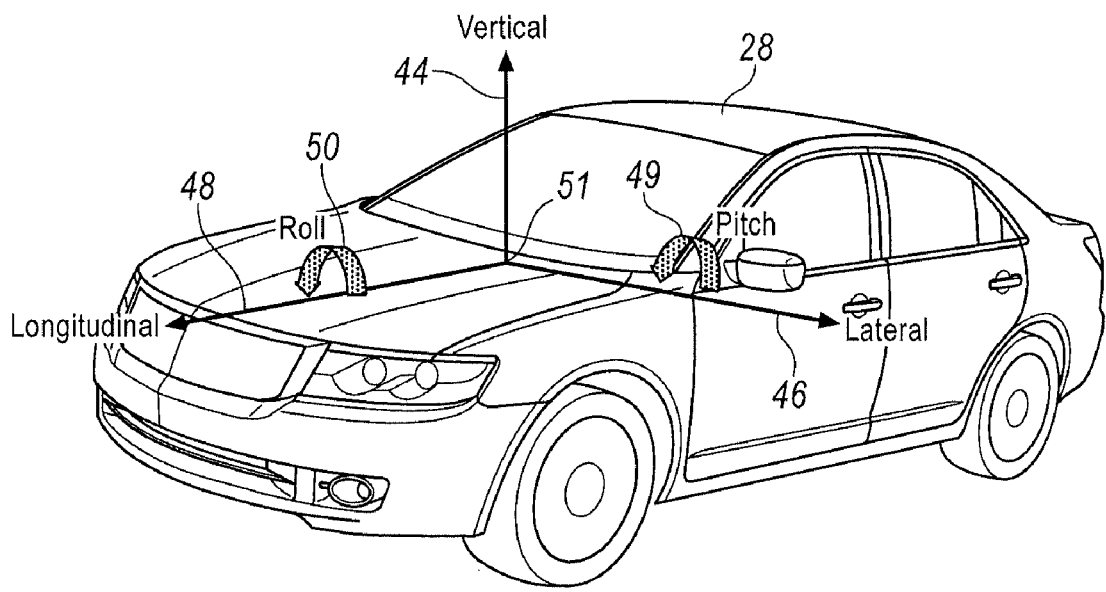
FIG. 2B is a perspective view of a vehicle superimposed over a coordinate system detailing vertical, longitudinal, lateral directions together with pitch and roll vectors.
Figure 5:
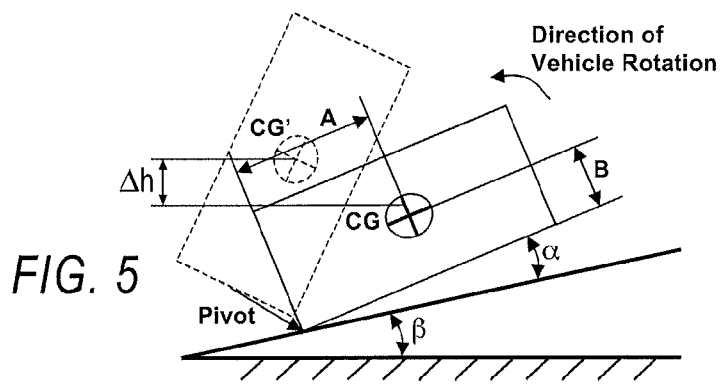
FIG. 5 is a schematic representing a simplified model showing vehicle rotation.

Specifically, and turning the FIG. 2B, there is depicted a simplified model for both vehicle 28 roll and pitch rotations. Superimposed are vertical axis 44, lateral axis 46, and longitudinal axis 48. Pitch 49 is along the lateral axis, and Center of gravity 51 is at the intersection of the axes previously described, and roll 50 is along the longitudinal axis 48. As shown in FIG. 5, the rotational axis, namely pivot, is at the lower left corner, instead of at the center of gravity CG. By considering both FIGS. 2B and 5, it can be understood that the vehicle rotates α degrees off the embankment that is with β degree inclination angle, In general, a vehicle critical angle can be estimated as $$\delta = \arctan\left(\frac{B}{A}\right) \quad (1)$$

where, A equals a half of vehicle width for roll-over event, and a distance between frontal bumper and Center of Gravity (CG) for pitch-over event. B equals a distance from ground to CG and from bottom edge of frontal bumper to CG for roll-over and pitch-over events, respectively.

The roll and pitch rates, measured by rotational sensors, can be used to compute roll and pitch angles. The threshold computation is based on Principle of Energy Conservation as, $$KE=PE \quad (2)$$

where, KE indicates rotational kinetic energy, and PE stands for potential energy.

The rotational kinetic energy can be expressed in terms of its moment of inertia. With N point masses $m_i$ moving with speeds $v_i$, the rotational kinetic energy KE equals, $$\begin{aligned} KE &= \sum_{i=1}^{N} \frac{1}{2} m_i v_i^2 \\ &= \sum_{i=1}^{N} \frac{1}{2} m_i (\omega \cdot r_i)^2 \\ &= \frac{1}{2} \sum_{i=1}^{N} m_i \cdot r_i^2 \cdot \omega^2 \\ &= \frac{1}{2} \cdot I_{pivot} \cdot \omega^2 \end{aligned} \quad (3)$$

where, ω is common angular rate.

The moment of inertia should be moved to the location of Pivot from CG as equation, $$I_{pivot}=I_{center}+m(A^2+B^2) \quad (4)$$

where, $I_{center}$ is substituted by $I_{xx}$ and $I_{yy}$ for roll and pitch moment of inertia, correspondingly.

The potential energy of the vehicle is given by the relation, $$PE=mg \cdot \Delta h \quad (5)$$

where, m is mass. g stands for gravitational acceleration of the earth. Δh is the difference between vehicle stability critical center of gravity location CG and current position of CG, which can be expressed as, $$\Delta h = \sqrt{A^2+B^2} - \sin(\alpha+\beta+\delta)\sqrt{A^2+B^2} = (1-\sin(\alpha+\beta+\delta)) \cdot \sqrt{A^2+B^2} \quad (6)$$

From a stable equilibrium considerations using Equations 2 through 6, the relation of roll angle and roll rate can be expressed as, $$(1-\sin(\alpha+\beta+\delta)) \cdot \sqrt{A^2+B^2} \cdot mg = \frac{1}{2}(I_{center}+m \cdot (A^2+B^2)) \cdot \omega_x^2 \quad (7)$$

If let $\omega_x=0$, $$\alpha_{max}=(90-\delta)-\beta \quad (8)$$

If let $\alpha=0$, $$\omega_{max} = \sqrt{\frac{(1-\sin(\beta+\delta)) \cdot \sqrt{A^2+B^2} \cdot mg}{\frac{1}{2}(I_{center}+m \cdot (A^2+B^2))}} \quad (9)$$

The above equation can be further simplified to a $1^{st}$ degree polynomial by applying regression techniques. The $1^{st}$ degree polynomial equation can be expressed as, $$\alpha+\beta=a \cdot \omega+b$$

Where, $$\alpha = -(\alpha_{max} + \beta)/\omega_{max} \text{ and}$$

$$b = \alpha_{max} + \beta. \quad (10)$$

Figure 6:
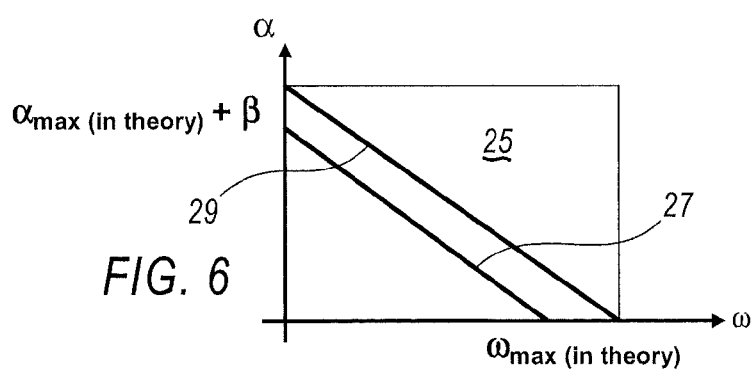
FIG. 6 is a schematic representation of the relation between angle and angular rate.

Equation 10 is depicted as line 27 is FIG. 6, which shows the relation between the angle and the angular rate.

The fuel cut-off control algorithm is designed to disable the fuel supply only when the vehicle experiences a severe crash accident. It is designed to wait further until it catches relevant strong signals that indicate the occurrence of a severe crash event, when compared to a vehicle rollover algorithm for occupant protection. In order to screen out weak signals, an additional coefficient is introduced into the simplified formula to ensure that the vehicle will roll or pitch over, when the algorithm is triggered. The modified formula is stated as, $$\alpha + \beta = \alpha \cdot \omega_x + b, c \quad (11)$$

where, c is an adjustable coefficient.

The modified relation between angle and angular rate is shown as a 29 in FIG. 6. Similar situation and calculations apply to vehicle pitch over situations, where A is equal to a distance between frontal bumper and CG and B is equal to distance between the bottom edge of frontal bumper to CG, roll rate $\omega_x$ is replaced with vehicle pitch rate $\omega_Y$ and $I_{xx}$ is replaced by $I_{yy}$ in equations 3 through 11.

Figure 3:
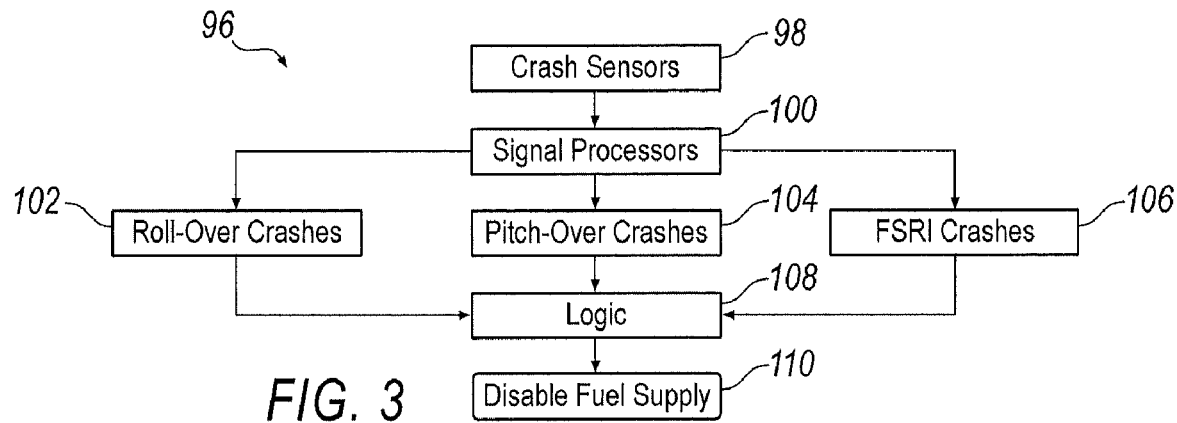
FIG. 3 is a high level flow chart showing the relation ship between fuel cut-off logic for roll-over, pitch-over and FSRI (front, side and rear impact) crash situations.

FIG. 3 is a block diagram for the three dimensional fuel cut-off control algorithm 96. Signal processors 100 process the signals received from the sensors 98 by applying variously numeric means. Then, the signals are sent to next stages to assess if respective thresholds are exceeded for roll-over crashes 102, pitch-over crashes 104 and FSRI crashes 106. Logic loop 108 handles all decision making using information from previous stages 102, 104 and 106. Finally, disable fuel supply 110 executes the final decision.

Figure 4A:
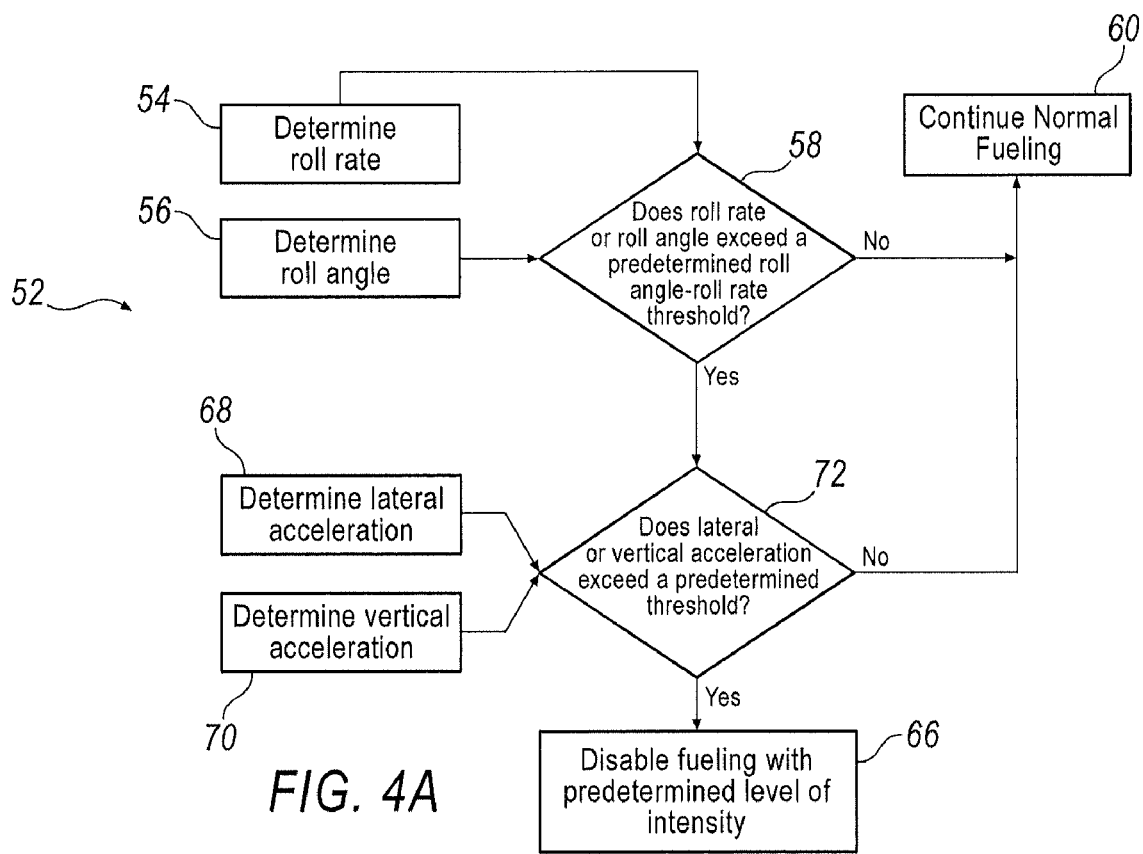
FIG. 4A is a schematic representation of a portion of a software flow chart detailing roll rate and roll angle based fuel cut-off determinations.
Figure 4B:
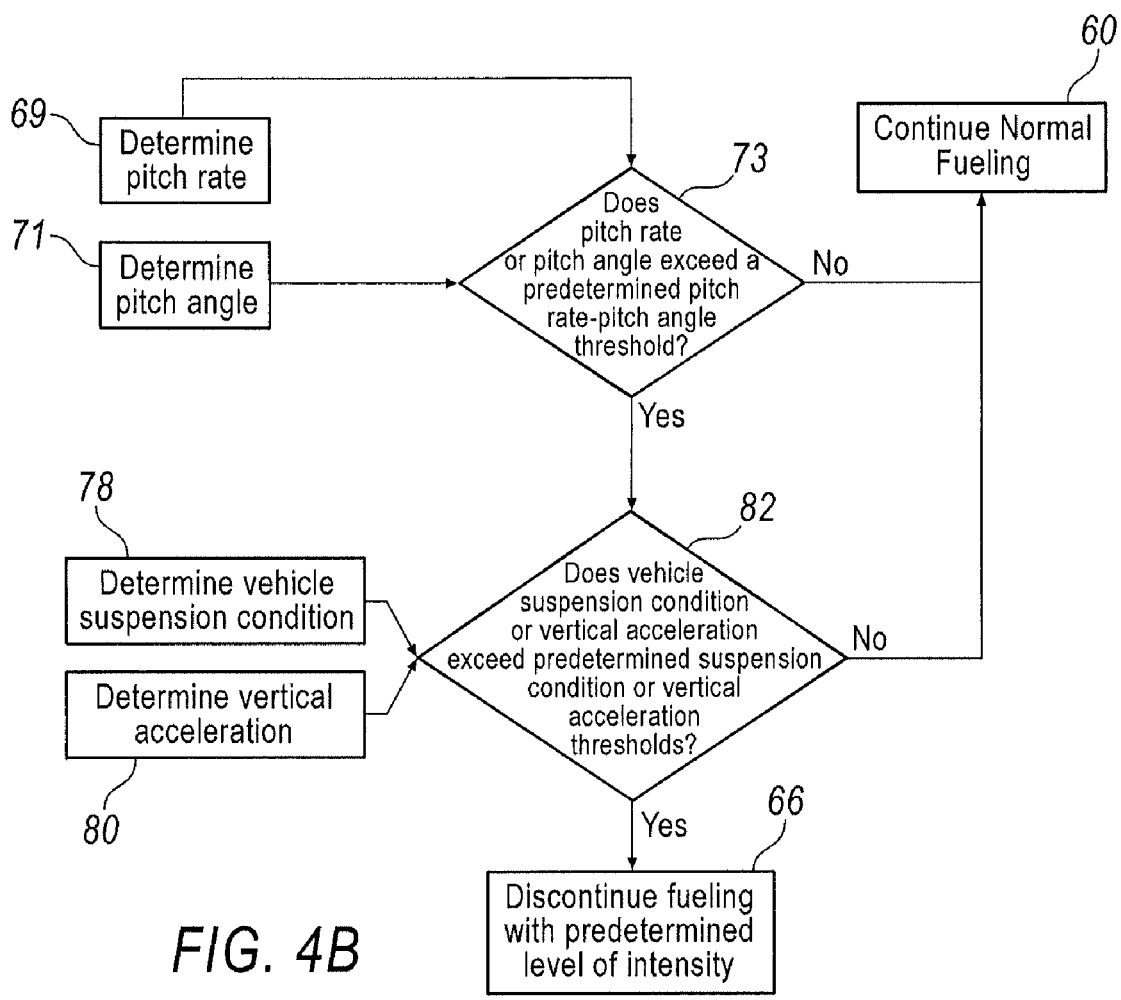
FIG. 4B is a schematic representation of a portion of the software flow chart of one embodiment of present disclosure detailing pitch rate and pitch angle based fuel cut-off determinations.
Figure 4C:
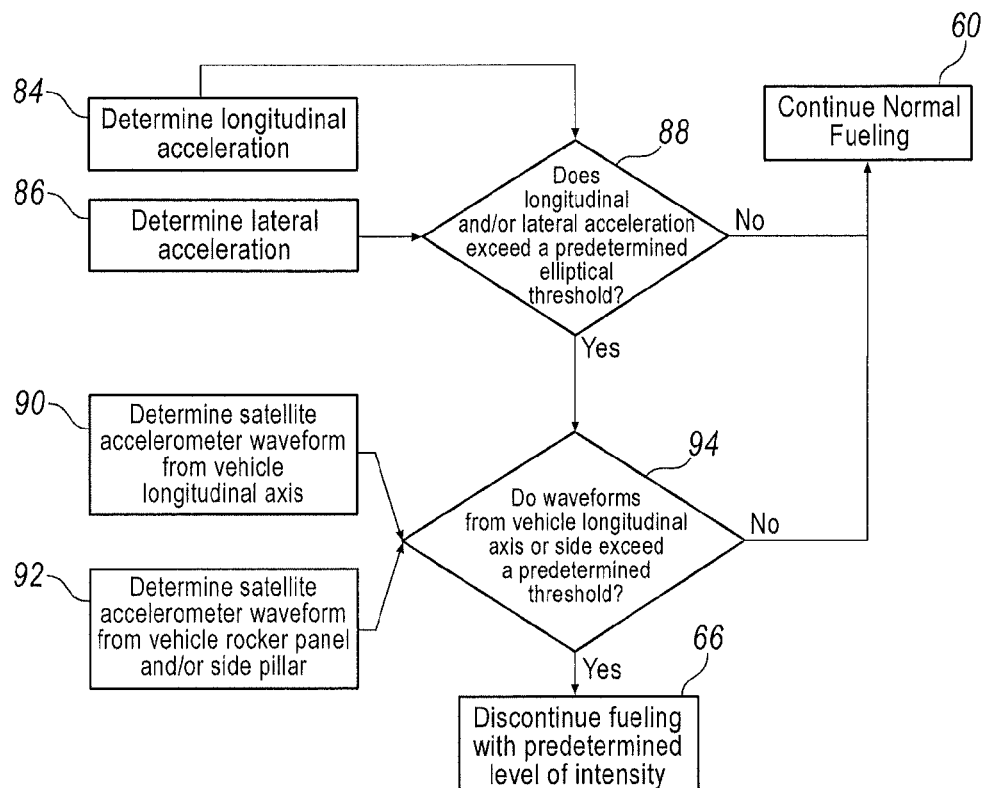
FIG. 4C is a schematic representation of a portion of the software flow chart of one embodiment of the present disclosure detailing longitudinal acceleration and lateral acceleration based fuel cut-off determination.

Turning to FIGS. 4A through 4C, there is represented therein one software flowchart detailing a non-limiting method according to one embodiment of the disclosure. Each of the software flow diagrams occurs simultaneous to each other, so that the restraint control module and the power control module can determine when or whether to activate an event notification signal to the smart fuel relay pump based upon input relative to longitudinal, lateral, vertical, roll or pitch data inputs received from crash sensors. FIG. 4A relates to 102 of FIG. 3, FIG. 4B relates to 104 of FIG. 3, and FIG. 4C relates to 106 of FIG. 3.

Specifically, as seen in FIG. 4A, method 52 begins with step 54 determining roll rate and step 56 determining roll angle and inputting those determination to the restraint control module or the power control module. Step 58 is determining whether the roll angle or roll rate exceed a predetermined roll angle-roll rate threshold. If no, step 60 is to continue normal fuel delivery. If yes, the control is transferred to step 72. Simultaneous to steps 54 and 56, step 68 is determine the lateral acceleration of the vehicle, and step 70 is determine the vertical acceleration of the vehicle. Step 72 is determining whether the lateral or vertical acceleration exceeds a predetermined lateral or vertical acceleration thresholds. If yes, the software proceeds to step 66, which is discontinue fueling with predetermined level of intensity. If no, the software loops back to step 60.

At the same time as the events described in regard to FIG. 4A occur, as seen in FIG. 4B, step 69 is determining the vehicle pitch rate and step 71 is determining the vehicle pitch angle. Step 73 is determining if the vehicle pitch rate or pitch angle are exceeding a predetermined pitch rate-pitch angle threshold. If no, normal fuel operation is continued in step 60.

If yes, the control is transferred to step 82. Simultaneously with the events previously described herein, step 78 is determining the vehicle suspension condition, and step 80 is determining the vehicle vertical acceleration. Step 82 is determining whether the vehicle suspension condition and/or vehicle vertical acceleration exceed a predetermined vertical suspension condition or vertical acceleration threshold. If no, the software loops to step 60. If yes, the software loops to step 66.

Turning to FIG. 4C, step 84 is determining the longitudinal acceleration and step 86 is determining the lateral acceleration. Step 88 is determining whether the longitudinal and lateral accelerations are exceeding a predetermined elliptical threshold. If no, the software loops back to step 60. If yes, the software proceeds to step 94. Simultaneously, with the occurrence of steps 84 and 86, step 90 is determining satellite accelerometer waveform from the vehicle longitudinal axis, and step 92 is determining satellite accelerometer waveform from vehicle lateral axis. Step 94 is determining whether the waveforms from the vehicle longitudinal axis or lateral axis exceed a predetermined threshold. If yes, the software loops back to step 66. If no, the software loops back to step 60.

While various embodiments have been set forth, those skilled in the art recognize that the words used are words of description, and not words of limitation. Many variations and modifications will occur without departing from the scope and sprit of the invention as set forth in the appended claims.

What is claimed as new and desired to be protected by Letters Patent of the United States is:

1. A method for controlling fuel delivery and signal output to a vehicle fuel pump, the method comprising:
   utilizing an algorithm in a restraint central module of the vehicle, the algorithm accessing a look-up table populated with data based upon a predetermined minimum and maximum changes in velocity and rotational rates in the three-dimensional model defined by lateral, longitudinal, pitch and roll directions respectively of a vehicle for a three-dimensional model; said algorithm deploying a fuel cut-off signal when crash sensors sense a vehicle crash condition that meet or exceeds a fuel cut-off threshold employed by the algorithm, wherein the fuel cut-off threshold is three dimensional.

2. The method of claim 1, wherein the fuel cut-off signal has varying intensity based upon data from crash sensors.

3. A method for controlling fuel delivery and signal output in a vehicle fuel pump, comprising: determining vehicle roll rate and roll angle: determining whether the roll rate or roll angle exceed a predetermined roll rate or roll angle threshold; determining lateral acceleration; determining vertical acceleration; determining whether lateral or vertical acceleration exceeds a predetermined threshold; determining vehicle pitch rate; determining vehicle pitch angle; determining whether pitch rate or pitch angle exceed a predetermined pitch rate or pitch angle threshold; determining vehicle suspension condition; determining vertical acceleration; determining whether vehicle suspension condition or vehicle acceleration exceed predetermined vertical acceleration or suspension thresholds; determining longitudinal acceleration; determining whether longitudinal or lateral acceleration exceed predetermined threshold; determining satellite accelerometer waveform from vehicle longitudinal axis; determining satellite accelerometer wave form from said vehicle side; determining whether waveforms from vehicle longitudinal axis or vehicle side exceed a predetermined threshold; discontinuing fueling with a predetermined intensity when at least one of said determining steps exceeds a predetermined threshold.

4. The method of claim 3, wherein the vehicle maintains normal fueling if either roll angle or roll rate does not exceed a predetermined threshold or lateral acceleration or vertical acceleration does not exceed a predetermined threshold; or if vehicle pitch rate or pitch angle does not exceed a predetermined threshold, or if vehicle suspension condition or vehicle vertical acceleration does not exceed predetermined suspension condition or vertical acceleration thresholds, or if lateral or longitudinal acceleration does not exceed said predetermined thresholds or if satellite waveforms from vehicle longitudinal axis or vehicle side does not exceed predetermined thresholds.

* * * * *